May 22, 1934.   F. J. RIPPL   1,960,066
METHOD OF AND APPARATUS FOR SOLDERING BASES
Filed Dec. 27, 1930   3 Sheets-Sheet 1

INVENTOR.
FRANCIS J. RIPPL,
BY
His ATTORNEY

May 22, 1934.  F. J. RIPPL  1,960,066
METHOD OF AND APPARATUS FOR SOLDERING BASES
Filed Dec. 27, 1930  3 Sheets-Sheet 2

INVENTOR:
FRANCIS J. RIPPL,
BY Charles F. Mulla
HIS ATTORNEY.

May 22, 1934.  F. J. RIPPL  1,960,066
METHOD OF AND APPARATUS FOR SOLDERING BASES
Filed Dec. 27, 1930  3 Sheets-Sheet 3
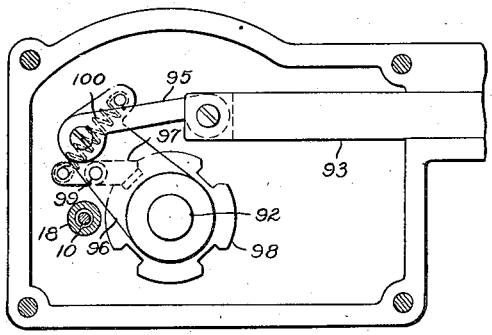
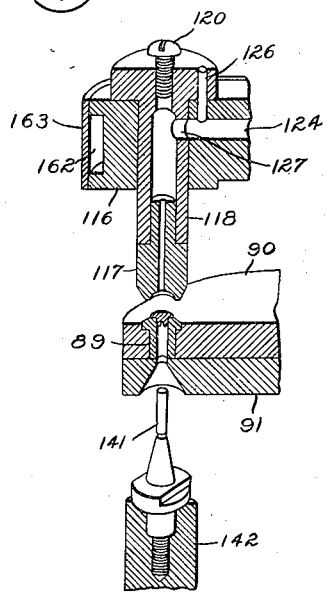
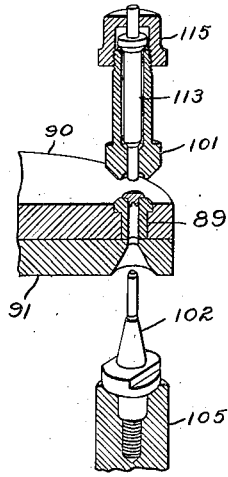
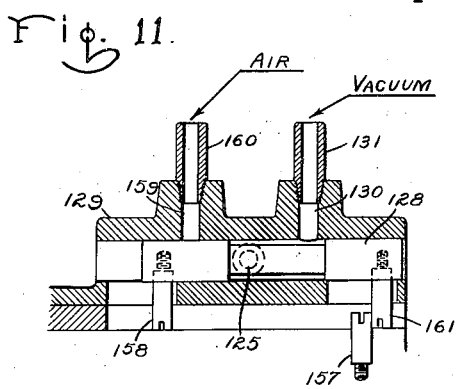
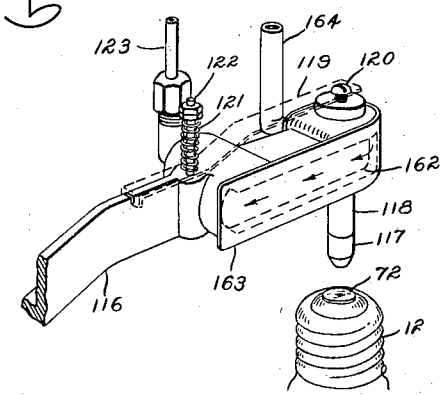
INVENTOR:
FRANCIS J. RIPPL,
BY
His ATTORNEY.

Patented May 22, 1934

1,960,066

UNITED STATES PATENT OFFICE 1,960,066

METHOD OF AND APPARATUS FOR SOLDERING BASES

Francis J. Rippl, East Cleveland, Ohio, assignor to General Electric Company, a corporation of New York Application December 27, 1930, Serial No. 505,136

4 Claims. (Cl. 113—59)

My invention relates to methods and devices for soldering the ends of the lead wires to the bases of electric incandescent lamps and similar articles. Such devices have been of two principal classes, i. e., those in which molten solder is delivered to the point of union and those in which solid solder is so delivered. My invention relates to the latter class. According to my invention, the solder in form of a wire is cut up into pieces and each of the pieces is delivered to a point of union on a base where it is fused. While this has been practiced heretofore, my invention comprises means for accomplishing the feeding of the solder and its cutting up and delivery which are more effective than those of the prior art because of more exact deposition of the piece of solder and its better retention until it has been fused.

Ordinarily there are two points on the base of the lamp or similar article at which a lead wire end must be sealed to a base part, i. e., at the side of the base and to the shell and on top of the base and to the center contact plate. According to my invention, after a piece of solder has been cut off it is speared and delivered to the point of union at the side of the base. A pointed rod with mechanism for reciprocating it accomplishes this with the cooperation of means for cutting the solder and supporting the cut-off piece in line with the path of movement of the said rod. Furthermore, according to my invention another mechanism is provided for feeding and cutting off pieces of solder each of which is carried and deposited in an aperture in the contact plate on top of the base through which or to which the end of a lead wire extends. The latter mechanism comprises a conveyor, specifically a rotating disc having apertures for receiving the solder pieces or "rivets" as they may be called, and a transporting means, specifically vacuum, which abstracts the rivets from the conveyor and delivers them one by one to the aperture in the base contact plate. Other features and advantages of my invention will appear from the description and from the accompanying drawings.

Figure 1:
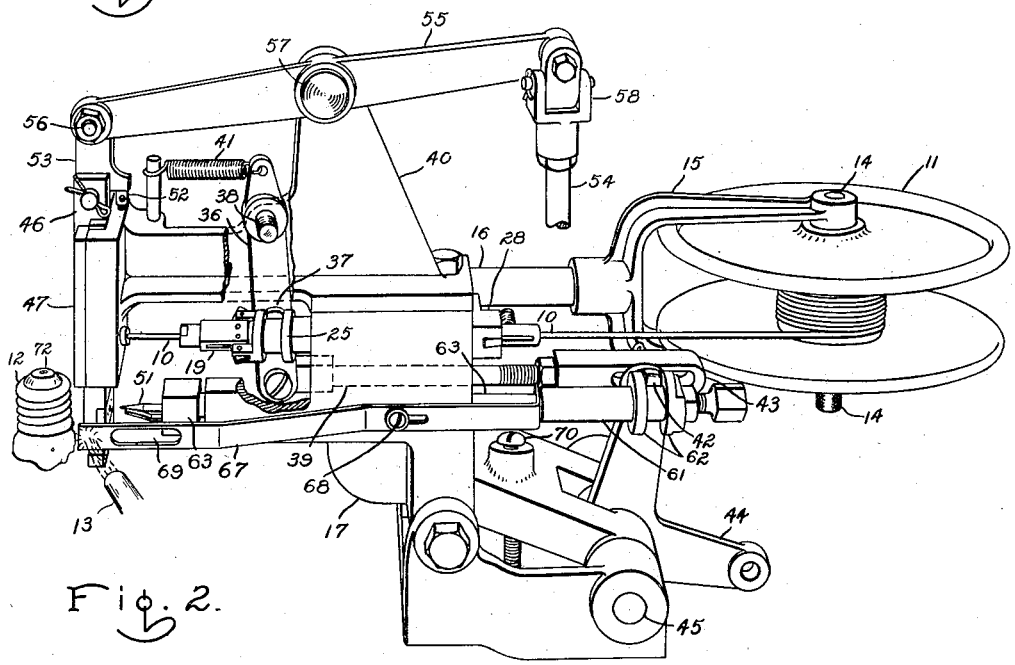
Figure 2:
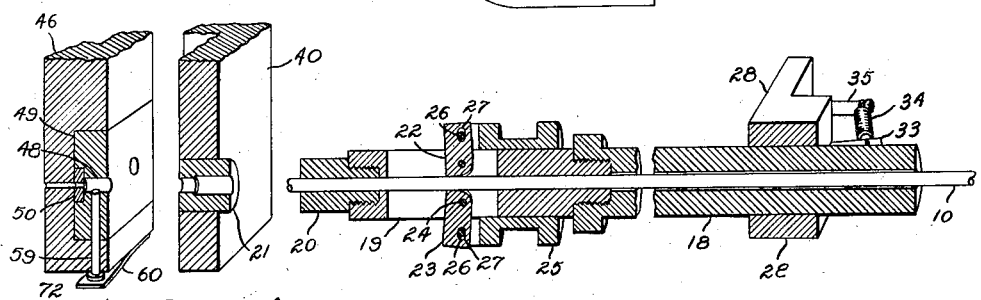
Figure 4:
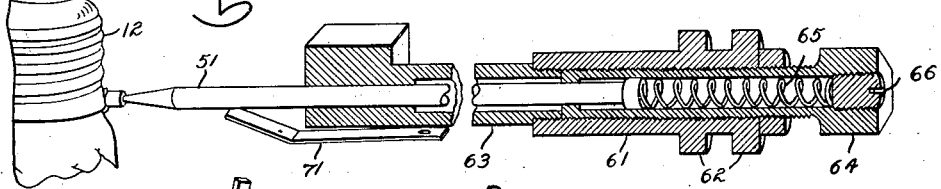
Figure 3:
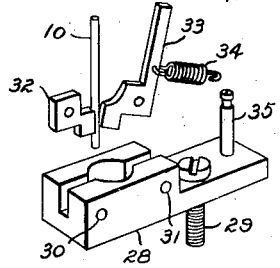
Figure 5:
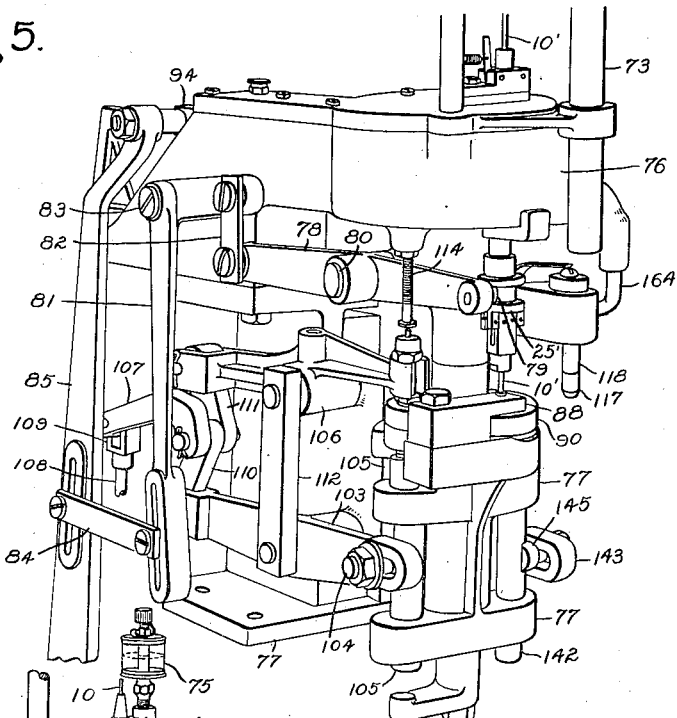
Figure 6:
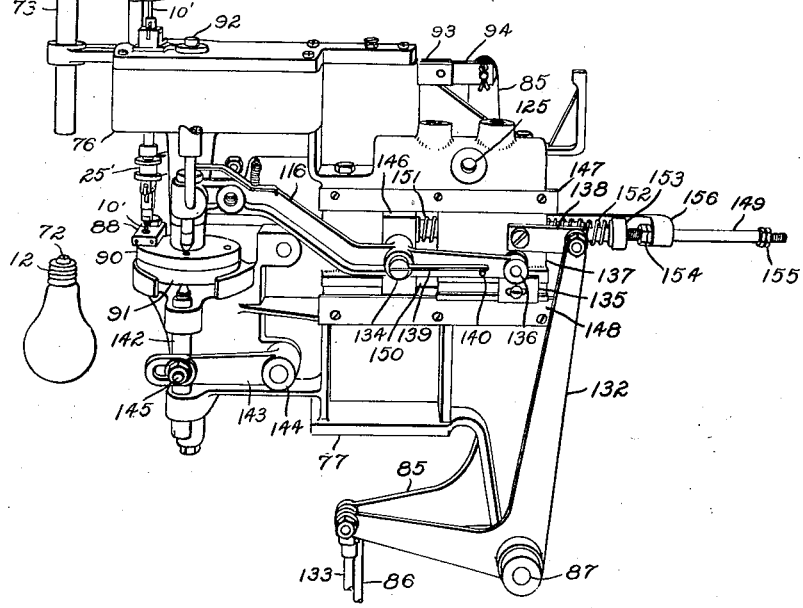

In the drawings, Fig. 1 is a perspective view of the side soldering device of my invention; Fig. 2 is a vertical section through the solder wire feeding and cutting mechanism thereof; Fig. 3 is an exploded perspective view of the clutch which prevents the soldering wire from backing up; Fig. 4 is a vertical section of the solder pellet transferring mechanism; Figs. 5 and 6 are perspective views of my top soldering device; Fig. 7 is a plan view of the indexing mechanism of the rivet forming turret; Fig. 8 is a vertical section through the rivet forming mechanism; Fig. 9 is a vertical section through the rivet transferring head; Fig. 10 is a perspective view thereof; and Fig. 11 is a vertical section through the suction controlling valve thereof.

Both of these devices of my invention are intended to replace the soldering devices used in connection with the incandescent lamp basing machine disclosed in Patent 1,708,756 to Fagan et al. issued April 9, 1929. That machine is provided with means whereby the lamp base is prepared for the operation of my soldering devices, the leading-in wires being cut to length and the solder flux applied. The basing machine also furnishes a convenient operating means in the vertically operating rods used in connection with the earlier devices and affords a means whereby the based lamps are brought and held in position before my devices. I have described my devices as they are used in connection with this machine although I am aware that other mechanism of quite different design could be very readily substituted for this machine.

Referring now to the drawings and particularly to Figs. 1 to 4 inclusive in which the side soldering device is shown, this device feeds solder wire 10 from the spool 11 and a piece or pellet of said wire after being cut from the remaining wire, is placed against the shell 12 of the base. A flame from the burner 13 then strikes the solder pellet causing the shell and a leading-in wire to be soldered together.

The solder wire supply spool 11, as shown in Fig. 1, is supported by pin 14 in yoke 15 which is attached to rod 16 projecting from the body 17 of the device. The wire unwound from the spool is threaded, as shown in Fig. 2, through aligned axial passages in rod 18, block 19, nozzle 20 and cutting die 21. Oppositely disposed slots in block 19 allow the solder wire to be engaged by grippers or fingers 22 and 23 which are operated about pins 24 through collar 25. As said collar is moved to the left the fingers are turned as pins 26 of said collar engage said fingers through slot 27. After the fingers have securely gripped the wire the continued movement of collar 25 causes the entire assembly to be moved to the left thus feeding the wire. By this movement rod 18 is caused to move longitudinally through body 17 of the device. The return movement of the collar first disengages the fingers and then returns the mechanism to its former position thus completing a cycle of operation. In order to stop any tendency for the wire to back up as this mechanism is returned, the clutch shown in Fig. 3 is used. The main portion of the clutch is the block 28 which is attached to the body 17 by screw 29 and which supports through pins 30 and 31 the fingers 32 and 33. These fingers operate through a slot cut in rod 18 and are constantly kept against the wire by spring 34 which is stretched between finger 33 and spring post 35. Collar 25 is operated by lever 36 which engages through pin 37 the flanges of said collar and which is operated about bolt 38 by rod 39. The supporting means of bolt 38 is bracket 40 which is fastened to the top of body 17. The return motion of lever 36 is produced by spring 41 as pin 42 which operates rod 39 through block 43 moves in the slot in said block. Pin 42 is located in one arm of lever 44, the other arm of which is engaged by an operating rod (not shown) which causes it to be operated about shaft 45 thereby operating this portion of the device.

While the solder wire is fed through die 21, slide 46 held within the ways of bracket 40 by plates 47 is in the raised position as shown in Fig. 2. In this position the opening 48 in insert plate 49 is directly opposite the opening in die 21 thereby allowing the end of the solder wire to enter opening 48 as the wire is fed. The extent to which the wire is advanced is governed by the circular insert 50. On the completion of the feeding operation slide 46 is lowered, cutting off that portion of the wire held in the plate 49 and carrying the solder pellet thus formed into direct line with the path of movement of the sharp point on rod 51 as shown in Fig. 1. The limit to which the slide is lowered is governed by the stop screw 52 which the projection of link 53 strikes as the slide drops. The lowering occurs as operating rod 54 is raised causing lever 55 which is connected to link 53 by bolt 56 to swing about pin 57 projecting from bracket 40. Operating rod 54 connects to lever 55 through universal joint 58. To prevent any possibility of the solder wire pellet held in the slide from falling out, a detent is used which consists of pin 59, the inner end of which bears against the pellet and which has a spring 60 bearing against its opposite end.

The solder pellet is speared by the sharp end of rod 51 which carries the pellet with it as it is withdrawn from the slide. This action results from a short movement of lever 44, the pin 42 of which moves in the slot in block 43 and operates sleeve 61 which it engages through flanges 62. Sleeve 61 is screwed to slide rod 63 and hollow bolt 64 which holds spring 65 and which is located between the flared out portion of rod 51 and screw 66. Slide 46 is now raised into position for another portion of solder wire which will be fed into it as earlier described by the movement of lever 44. This motion causes rod 51 which is operated as just described, to be moved to the left until the solder pellet on its end is pressed against the shell 12 of the base. The point at which said pellet strikes is also occupied by an end of one of the leading-in wires and has been fluxed by a portion of the basing machine. The flame from burner 13 is now allowed to strike the pellet as the flame deflector 67 is moved ahead thereby causing the leading-in wire and the shell to be soldered together. As deflector 67 is supported by screw 68 attached to slide rod 63 and operating in a slot in body 17, the motion of rod 51 will carry it forward allowing the flame to pass through the slot 69. Body 17 swings from shaft 45 and is therefore free to be tilted by adjusting screw 70 in order to change the point at which the solder pellet will strike the base. With the return movement of rod 51, any solder left on said rod will be removed by spring scraper 71 which is fastened to the body of the device. The operation of this device is now complete and the lamp is moved to the top soldering device.

This device feeds from a supply spool a length of solder wire which is cut off, formed into a rivet and placed in the hole on contact plate 72 of the base. Heat is applied to the solder rivet by several burners (not shown) which heat is just sufficient to solder the leading-in wire to said plate without materially changing the shape of the rivet.

The solder wire is unwound from a spool (not shown) which is a duplicate of the one shown in connection with my other device and which is supported on rod 73 shown in both Figs. 5 and 6. The wire 10' passes from the spool down through arm 74 which oils said wire by means of a felt wet with oil from cup 75. From here the wire enters the feeding mechanism which is similar to the corresponding mechanism used with my other device shown in Figs. 2 and 3. This mechanism is operated vertically in the upper portion 76 of the standard 77 by lever 78 which engages the flanges of collar 25' similar to collar 25 through pin 79. This lever 78 is operated about pin 80 by lever 81 which is connected to it by link 82 and which operates about pin 83 extending from the upper part 76 of the device standard. The swing of this lever and consequently the amount of wire fed is controlled by link 84 which may be attached to levers 81 and 85 in any location along the slot in each lever. Lever 85 is actuated by operating rod 86 (Fig. 6) which turns the lever about shaft 87 extending from the standard of the device.

The solder wire fed as just described passes through an opening in die 88 into the hollow insert 89 (Fig. 8) in disc 90 to the extent limited by circular plate 91 located below. The plate is bolted directly to the standard while the disc 90 is attached to a shaft running up through the upper portion of the standard. This shaft 92 connects to the mechanism shown in Fig. 7 which causes the disc to be indexed 90° after every wire feeding operation. The indexing occurs as lever 85 is drawn back after the forward motion which feeds the wire and as slide bar 93 to which said lever is connected by link 94 moves to the left. As shown in Fig. 7, this bar is connected by link 95 to arm 96 which engages by means of pawl 97 the ratchet wheel 98 attached to shaft 92. The pawl operates about pin 99 in said arm and is held against the ratchet wheel by the action of spring 100. The first time the wheel is indexed after the solder wire is fed, it causes that portion of the wire held in said wheel to be cut from the remaining wire. This occurs as insert 89 in the wheel passes beyond the opening in stationary die 88.

On reaching the new position, shown in Fig. 8, 90° from the old, the solder pellet is formed into a rivet which, in the preferred form shown, has a shank portion hollowed out so that it presents thin edges and fuses more readily than the head portion of the rivet when it is later heated. The forming of the rivet occurs as the solder pellet is driven into the end of die 101 which is now held against insert 89 by the plunger 102 which travels upwardly. Plunger 102 is operated through lever 103 which engages by means of a pin 104 a slot in rod 105 to which said plunger is attached. Die 101 is operated through lever 106 which like lever 103 is operated about a pin from the standard of the device by the movements of lever 107. That lever is operated about a pin (not shown) in the standard 77 by operating rod 108 which connects to it through universal joint 109. The action of the end of this lever is such that links 110 and 111 which are connected thereto and to levers 103 and 106 cause the ends of said levers to be separated thereby forming the rivet. The pins about which levers 103 and 106 operate are connected together by bar 112. As die 101 is raised after the rivet is formed, plunger 113 strikes the flared out portion of stationary pin 114 (Fig. 5) causing it to take the position shown in Fig. 8 removing the rivet from the die. Plunger 113 is kept with die 101 by the capscrew 115. The disc 90 is now indexed two 90° movements before it is again operated upon.

From this position 270° clockwise around the disc the solder rivet is transferred to the eyelet 72 of the lamp base. The transferring operation is performed by the suction head shown in Figs. 6, 9 and 10 which is located in the end of lever 116 and which is controlled by the automatic valve shown in Figs. 6 and 11. The suction head is lowered from the position shown onto the rivet by the raising of the other end of lever 116. This causes this end of the lever to travel down more than is necessary to bring nozzle tip 117 against insert 89 thereby causing hollow nozzle 118 to slide upwardly in lever 116. This action occurs against the action of lever 119 which presses against screw 120 with the force of spring 121 held by screw 122. Vacuum is now applied to the nozzle tip through pipe connection 123 which connects to passage 124 and is attached by means of a rubber hose (not shown) to a short length of pipe at opening 125 of the automatic valve. Pin 126 acts as a guide for nozzle 118 to keep hole 127 always opposite passage 124. At this point in the operation of the transferring mechanism vacuum is applied to the nozzle, therefore piston 128 is in the right half of valve housing 129 allowing free passage of vacuum from passage 130 to passage 125. Pipe 131 in the opening of passage 130 connects through a hose (not shown) directly to the machine's source of vacuum.

The nozzle now having seized the solder rivet is raised to the position shown. This action occurs with the first movement of lever 132 to the left which is operated about shaft 87 by operating rod 133. By the resulting action lever 116 is rotated about pin 134 by the thinner portion of cam 135 which is now located below a roller on the end of pin 136. Cam 135 is moved to this position by slide 137 to which it is fastened and which is connected to lever 132 by link 138. The actual energy for rotating lever 116 is furnished by spring 139 which is held by stationary pin 134 and operates against spring post 140. With the raising of the nozzle, plunger 141 (Fig. 9) is raised by rod 142 driving the rivet out of insert 89 and into the nozzle. This action results from the movement of lever 143 which is turned by shaft 144 and which engages by pin 145 a slot in rod 142. Shaft 144 is turned by lever 103 to which it is fastened. The lowering movement of the nozzle occurs with the corresponding opposite movement in lever 132.

The continued movement of lever 132 causes the nozzle to move out over the lamp base where it is again lowered. The horizontal movement is produced by slide 146 which supports lever 116 through the pin 134 and which is held like slide 137 in the ways in standard 77 by plates 147 and 148. This slide 137 is supplied additional supporting means for slide 146 through rods 149 and 150 which are free to slide horizontally in slide 137. The horizontal transferring motion in slide 146 is produced by springs 151 and 152, the former of which is partially enclosed in a well in slide 137 and operates against the face of both slides, and the latter operates between slide 137 and collar 153 on rod 149. There is no action in the springs as the suction mechanism is moved forward or backward except at both ends of the movement at which time either nuts 154 or 155 stop the horizontal movement of the suction mechanism by striking projection 156 of standard 77. The continued movement of slide 137 causes the thicker portion of cam 135 to lower the nozzle, as just described, at this point in the operation of the device. The rivet is then held over the opening in the center of the eyelet 72 into which it is blown as air is now applied to the nozzle instead of vacuum. This occurs as post 157 (Fig. 11) in the top of slide 137 strikes post 158 moving piston 128 to the left. The thicker portion of the piston will now cover vacuum passage 130 and the thinner portion of the piston will be below passage 159. As pipe 160 in this passage is connected to the machine's source of air, air will pass out through opening 125 to the transferring nozzle. With the return motion, post 157 strikes post 161 turning on the vacuum. The transferring nozzle now returns allowing flames from burners (not shown) to complete the soldering operation. The end of lever 116 supporting the nozzle (Fig. 10) is kept cool by the passage of air through opening 162 around said lever behind plate 163. The air enters this passage through pipe 164.

What I claim as new and desire to secure by Letters Patent of the United States, is:

1. An apparatus for soldering lead wires to bases of incandescent lamps and similar devices comprising a means for successively presenting pieces of solder, mechanism for transferring said pieces in succession to a base and definitely locating each of them at the junction of the end of a lead wire and said base so that it may not move comprising a pointed rod and means for reciprocating the same to spear a piece of solder and to transfer it and to hold it at the said junction, and means whereby said parts are caused to operate in proper sequence and in definite time relation to each other.

2. An apparatus for soldering lead wires to bases of incandescent lamps and similar devices comprising means for feeding solder wire, cutting mechanism for forming pieces of solder therefrom and presenting each piece at a definite point, transferring mechanism for said pieces comprising an engaging member and actuating mechanism therefor whereby each of said pieces is engaged and definitely located at the junction of a lead wire end and a base and means for causing said parts to operate in proper sequence and in definite time relation to each other.

3. The method of soldering lead wires to the bases of incandescent lamps and similar articles which consists in spearing a piece of solder with a pin, holding said piece of solder by said pin against a portion of said base contiguous to an end of a lead wire, fusing said piece of solder and then withdrawing said pin.

4. In a soldering apparatus, the combination of a cutting mechanism comprising a slide having a die therein to receive a length of solder wire, means for feeding said wire to said die, means for moving said slide transversely of said wire feed to sever a pellet of solder and position it in line with the locus of the soldering operation, a pointed rod movable in said line, means for reciprocating said rod to cause the point thereof to spear said pellet of solder, then in a reverse direction to withdraw said pellet from said die and then toward the object to be soldered and means for moving said slide to allow the passage of said rod.

FRANCIS J. RIPPL.